UNITED STATES PATENT OFFICE.

ARTHUR N. BENNETT, OF CHICAGO, ILLINOIS, ASSIGNOR TO STERILIZED EGG COMPANY, OF CHICAGO, ILLINOIS, A CORPORATION OF ILLINOIS.

METHOD OF PRESERVING EGGS.

1,197,707.  Specification of Letters Patent.  Patented Sept. 12, 1916.

No Drawing.  Application filed February 11, 1916.  Serial No. 77,554.

*To all whom it may concern:*

Be it known that I, ARTHUR N. BENNETT, a citizen of the United States, residing at Chicago, in the county of Cook and State of Illinois, have invented certain new and useful Improvements in Methods of Preserving Eggs, of which the following is a specification.

The object of my invention is to provide a new and improved method of preserving eggs by subjecting them for a brief period of time to a high atmospheric temperature, whereby they may be preserved for a considerable length of time in a fresh and edible condition.

In United States Patent No. 1,092,897, granted April 14, 1914, upon application of Victor Clairemont, there is described a process of preserving eggs by suddenly subjecting them for a brief period of time to the action of a heating solution having a temperature sufficient only to coagulate the albumin content in immediate contact with the inner side of the shell without affecting the edible portion of the egg, and then applying a sealing coating to the outer side of the shell. In the practice of preserving eggs according to this process it has been found, however, that if the shells of the eggs are wet or permeated with moisture, the moisture seems to be driven inwardly into the egg, with injurious results to its keeping qualities, this effect being apparently due to the fact that the solution, or oily liquid, which is used as the heating and sealing solution quickly coats and seals the outer surface of the shell, so that escape of the superfluous moisture outwardly is prevented.

My present invention obviates this difficulty and may be regarded as an improvement or development of the process described in the patent referred to.

In my new and improved process, the eggs, suitably supported in foraminous trays, are conveyed into a chamber or receptacle which is heated to a high temperature and there for a short period of time subjected to the dry atmospheric heat, so that superfluous moisture on or in the shell is evaporated and germs and all forms of bacterial life to a greater or less degree destroyed, and the membranous and albuminous layers between the shell and the mass of albuminous matter which forms the white of the egg are coagulated and, as it were, fused together to form an impervious coating which acts to seal the edible contents within, and prevents or greatly retards deterioration and decay. In practice it has been found that a temperature of from two to six hundred degrees Fahrenheit may be employed, and that an exposure of from about four seconds—at the higher temperature mentioned—to about thirty seconds, at the lower temperature, will give good results. In any case, the heat must be sufficiently high to act quickly so that the outside layers of the eggs may be quickly acted on, and any gradual heating or cooking of the edible mass of white and yolk avoided, and sufficiently low to avoid injury to the surface of the shell in the time required for the heat to penetrate the layers immediately within the shell which are to be acted upon. The length of time which the eggs are subjected to the heat of course varies in accordance with its intensity, and must be such as to produce the coagulating and hardening or sealing effect above described without affecting the edible portion of the egg.

The heating process which has just been described is in itself sufficient to greatly increase the keeping qualities of eggs, but I consider it advantageous to apply to the shell an impervious coating which seals the surface of the shell and further protects the contents of the egg against adverse influences from without, such as the penetration of moisture and disagreeable odors and bacterial growth, and which also prevents evaporation of the moisture of the egg contents. A suitable material for this purpose is any non-volatile oil which does not quickly become rancid and will fill the pores of the shell, as, for example, the liquid mineral oil commercially known as petrolatum, which is applied immediately after the heating treatment, the shell being then thoroughly dry, so that no injurious after-results, such as above mentioned in connection with the Clairemont process, are liable to follow.

In practically carrying out my invention, I provide a carrier which is adapted to receive a plurality of egg trays and which may be intermittently shifted to carry the eggs into the heating compartment, and then into a vessel containing the coating and sealing material, and back into position where the tray may be removed and a fresh tray of eggs be substituted. Any suitable apparatus may of course be employed to carry out these steps described.

It may be desirable, in some cases to shorten the period of time during which the eggs are subjected to dry atmospheric heat, and employ a hot coating and sealing bath to which the eggs are subjected a sufficient length of time to supplement and complete the action of coagulating the membranous layers next the inside of the shell. In such case the joint results of the two steps are the same as in the operation first described, and I consider such modified treatment as coming within the scope of my invention.

I claim:

1. A process for preserving eggs, which consists in subjecting the eggs to a high degree of dry atmospheric heat for a length of time sufficient only to evaporate superfluous moisture on and in the shell of the egg and solidify and coagulate the membranous and albuminous layers of the egg immediately next the inner side of the shell without affecting the edible portion of the egg content.

2. A process for preserving eggs which consists in subjecting the eggs to a high degree of dry atmospheric heat for a length of time sufficient only to evaporate superfluous moisture on and in the shell of the egg and solidify and coagulate the membranous and albuminous layers of the egg immediately next the inner side of the shell without affecting the edible portion of the egg content, and then applying a sealing coating to the shell itself.

3. A process for preserving eggs which consists in subjecting the eggs to a high degree of dry atmospheric heat for a short time and then subjecting the eggs to the action of a heated solution forming a sealing coating to the egg, the eggs being subject to said atmospheric heat and the action of said heated solution for an aggregated length of time sufficient only to evaporate superfluous moisture on and in the shell of the egg and solidify and coagulate the membranous and albuminous layers of the egg immediately next the inner side of the shell without affecting the edible portion of the egg contents.

ARTHUR N. BENNETT.

Witnesses:
Louis B. Erwin,
Robert A. Dobberman.